Figure 1:
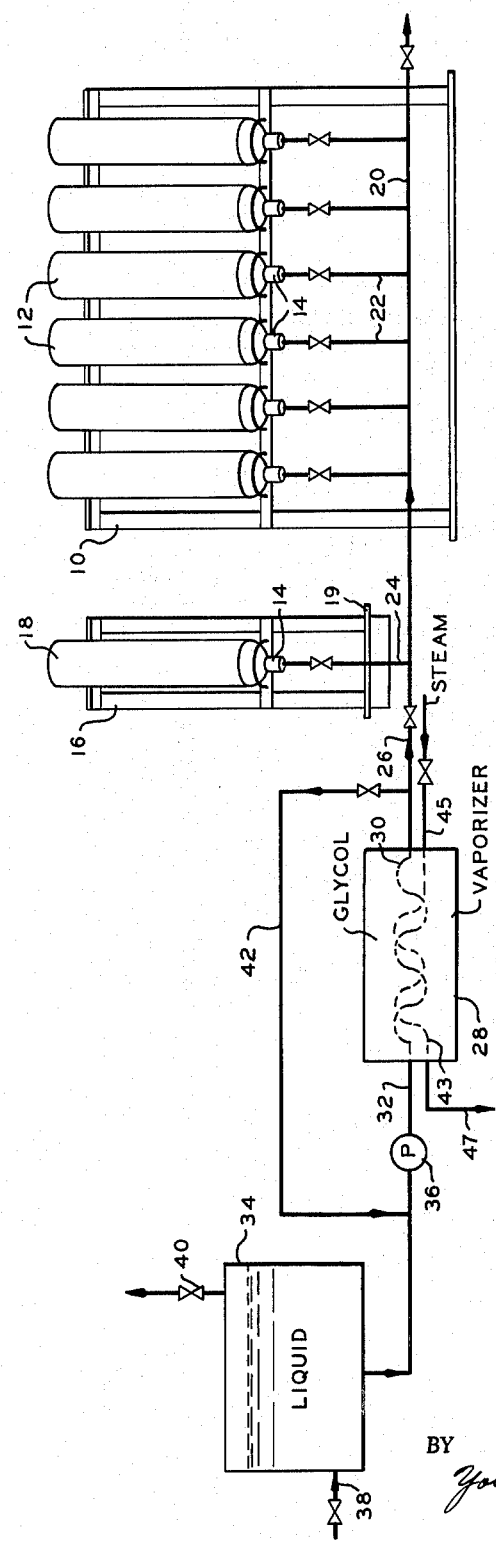

INVENTORS
J.H. ENGEL
H.A. SWANSON
BY
Young & Quigg
ATTORNEYS

March 22, 1966  J. H. ENGEL ET AL  3,241,328
CYLINDER LOADING WITH LIQUEFIABLE GASES
Filed Jan. 6, 1964  2 Sheets-Sheet 2
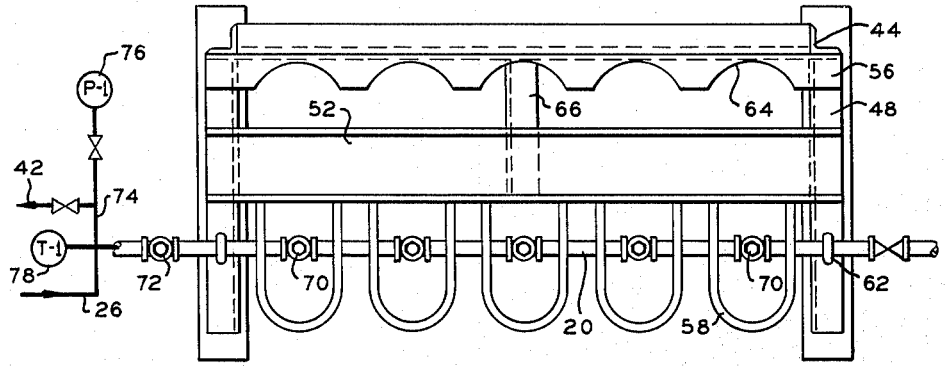
FIG. 3
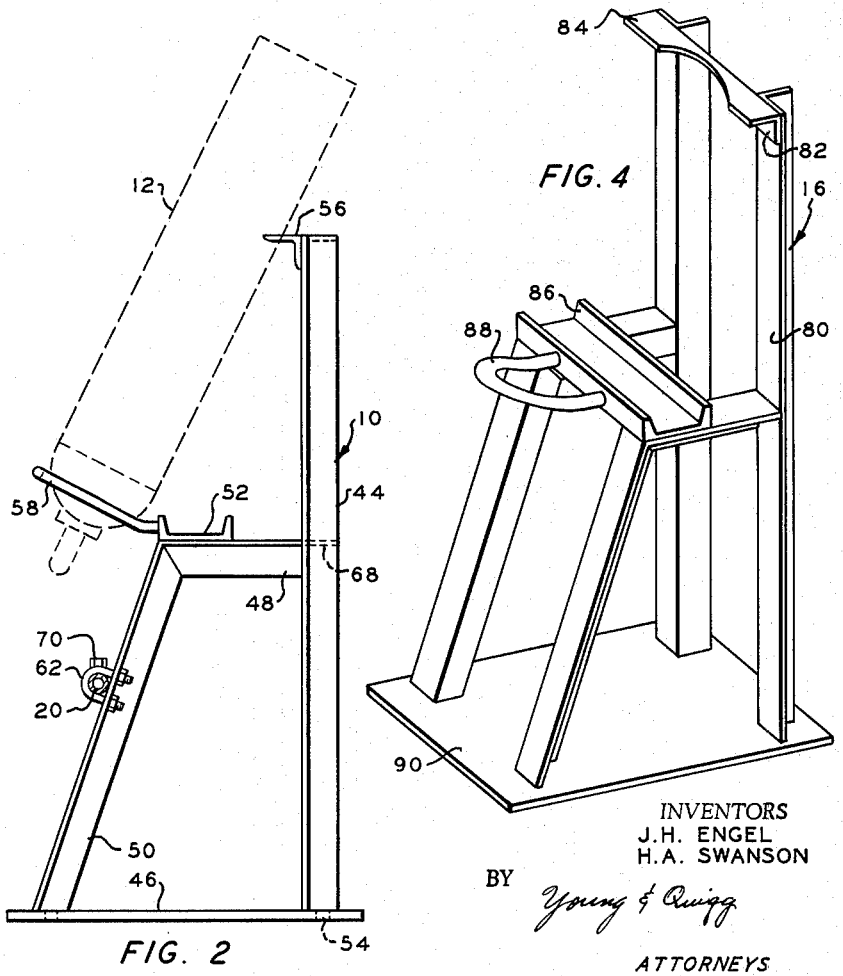
FIG. 4
FIG. 2
INVENTORS
J.H. ENGEL
H.A. SWANSON
BY *Young & Quigg*
ATTORNEYS

United States Patent Office 3,241,328
Patented Mar. 22, 1966

3,241,328
CYLINDER LOADING WITH
LIQUEFIABLE GASES
John H. Engel and Herman A. Swanson, Sweeney, Tex.,
assignors to Phillips Petroleum Company, a corporation
of Delaware
Filed Jan. 6, 1964, Ser. No. 335,757
5 Claims. (Cl. 62—49)

This invention relates to apparatus and a process for loading cylinders with liquefied gases.

High pressure gas cylinders can be loaded much faster and with cheaper equipment if they can be loaded with product in a sub-cooled liquid form. Heretofore, this has not been practical because cylinders can be loaded only to a fraction of volumetric capacity as specified by Interstate Commerce Commission regulations. The allowed fraction varies with the product as well as the size of the cylinder and is specified by weight. This requirement has led to the use of loading systems involving compressors with net weight being determined by weighing the individual cylinders or by exact measurement of temperature and pressure. The latter technique is inaccurate because of non-isothermal conditions in the loading system. Moreover, heat of compression is a significant problem. This invention is concerned with an improved process and apparatus for loading cylinders with liquefied gases which is faster, more economical, and less labor consuming than systems previously in operation.

Accordingly, it is an object of the invention to provide an improved process and apparatus for loading high pressure storage cylinders with liquefied gas. A further object is to provide a process and apparatus for loading cylinders to a given weight of contents more rapidly and economically than heretofore possible. Other objects of the invention will become apparent upon consideration of the accompanying disclosure.

A broad aspect of the invention comprises pumping liquefied gas into a vaporizer in which the gas is heated to a temperature below the critical temperature while maintaining equilibrium conditions at said temperature, continuing the pumping so as to force fluid from the vaporizer through a conduit system into inverted storage cylinders positioned with their necks at the same filling level, supporting one of the cylinders on a weighing device, and when a predetermined weight of the liquefied gas has been deposited in the weighed cylinder, cutting off the flow of fluid to all of the cylinders so as to terminate loading at substantially the same loaded level therein. A single cylinder in the group is suspended on or from a weighing device, such as a platform scale, and the liquid level in all of the cylinders is the same during the filling so that when the weight of the weighed cylinder reaches the predetermined weight based upon the permissible loaded volume, the same level of the liquefied gas is obtained in the other cylinders. Hence, cutting off the flow when the proper weight is reached in the weighed cylinder provides the same volume and weight of filled liquid in the other cylinders. This assumes that the cylinders are substantially identical. In commercial operation, cylinders are returned to the loading station periodically for reloading and, of course, similar cylinders are simultaneously loaded.

The apparatus of the invention comprises a main rack for holding a plurality of storage cylinders in inverted form with their necks at a fixed level, a separate individual rack for supporting a cylinder in inverted position with its neck at the same level as the level of the necks in the main rack, and a weighing device supporting the individual rack. A manifold conduit is provided with separate individual flexible loading lines for each cylinder rack space and with a similar loading line for the individual rack. The manifold is connected by conduit means with a vaporizer or source of liquefied gas at equilibrium conditions with pumping means associated therewith for delivering fluid to the conduit means and cylinders.

A more complete understanding of the invention may be had by reference to the schematic drawing of which FIGURE 1 is a view showing an arrangement of apparatus for effecting the process of the invention; FIGURE 2 is a side elevation of a preferred rack structure; FIGURE 3 is a plan view of the rack of FIGURE 2; and FIGURE 4 is a front elevation of an individual rack.

Referring to FIGURE 1 a rack 10 supports a plurality of cylinders 12 in inverted position with filling necks 14 at the same level. A separate individual rack 16 supports weighed cylinder 18 in inverted position with neck 14 at the same level as the cylinder necks in rack 10. Rack 16 rests on a platform scale designated 19. A manifold conduit 20 extends along the racks 10 and 16 and is provided with individual loading lines 22 for main rack 10 and 24 for individual rack 16. Loading lines 22 and 24 are made of flexible conduit or hose capable of withstanding high pressure such as 1500 to 2000 p.s.i. or higher. A supply line or conduit 26 connects manifold 20 with vaporizer 28 and more specifically with coil 30 which is supplied with liquefied gas at the opposite end of the vaporizer through a fed line 32 which connects with a liquefied supply of the gas in tank 34. Line 32 is provided with a pump 36 which delivers liquefied gas from tank 34 to the coil 30 and vaporizer 28. Liquefied gas from any suitable source is fed to tank 34 through line 38 and a vent line 40 is provided in this tank. A recycle line 42 from line 26 to line 32 upstream of pump 36 is provided for use as desired in the process. A steam coil 43 in vaporizer 28 is supplied with steam from line 45 and vents through line 47. Tank 34 is filled with glycol as a heat exchange fluid, which prevents any substantial fluctuation in temperature within the vaporizer.

In FIGURE 2 a preferred embodiment of the frame support structure is shown wherein rack 10 comprises an upright frame 44 formed of an angle iron and attached to a base plate 46 by welding or other means. A knee structure formed of a horizontal angle iron 48 and an oblique angle iron 50 at each end of the rack supports a horizontal transverse U-shaped angle iron 52. Angle irons 48 and 50 are welded together and attached by welding or other means to upright 44 and base plate 46, respectively. Holes 54 are provided in base plate 46 for anchoring to a solid base with bolts and nuts. Uprights 44 are tied together at their top ends by top support plate 56 which has the form of a T and is shown more in detail in FIGURE 3. Support loops 58 are welded to the front edge of U-member 52 to provide a fixed support for the lower end of cylinder 12 shown in position in the rack. These support loops are precisely positioned so as to support the necks of the cylinders at the same level when base plates 46 are installed on a horizontal support base. U-bolts 62 attached to angle iron 50 support manifold conduit 20, shown in FIGURE 1.

FIGURE 3 shows a plan view of the main rack having the construction discussed in relation to FIGURE 2. Top support plate 56 is provided with arcuate recesses 64 opposite support loops 58 for each cylinder in the rack. Angle iron 66 is welded to the bottom of U-member 52 and to angle iron typing uprights 44 together near their mid section, designated 68 in FIGURE 2.

Manifold conduit 20 passes through U-bolt 62 directly under loops 58 and is provided with connections 70 for each cylinder position in the rack. Connector 72 provides for a flexible hose connection with the weighed cylinder which is supported in a separate rack. Bleed-off or recycle line 42 connects with a branch line 74 in which is positioned pressure indicator 76. A temperature indicator 78 is connected on the end of manifold 20 and fill line 26 connects with manifold 20 for supplying fluid to the loading system.

FIGURE 4 is a front view of an individual support rack 16 for the weighed cylinder. This support rack is constructed similarly to support rack 10 having upright angle irons 80 tied together at the top by a top support plate 82 in the form of a T with one arcuate recess 84. Lower support plates 86 extends between uprights 80 and supports loop 88. Base plate 90 is welded to uprights 80 and is designed to rest on a platform scale positioned on the same support foundation as main rack 10. Individual rack 16 has the same dimensions from lower support plate (U-member) 86 to the top thereof as main rack 10 but is 6" shorter from support plate 86 down to the bottom of base plate 90 than the corresponding dimension of main rack 10 so as to provide for a platform scale 6" high. Obviously, this 6" shorter dimension must be modified in accordance with the height of the platform scale used in a particular installation. Likewise, it is feasible to use any other kind of weighing device with the individual rack 16.

The loading system illustrated in drawing constructed in accordance with FIGURES 2, 3, and 4 is in operation filling storage cylinders with liquid ethane in accordance with the invention. This system is from 4 to 12 times faster than the prior art systems, is cheaper to build and requires considerably less labor.

In operation of the commercial loading process, tank 34 is an overhead accumulator of a fractionator (deethanizer) containing ethane liquid and ethane vapor in equilibrium with one another at approximately 20° F. and 290 p.s.i.a. Liquid ethane is pumped to vaporizer 28 wherein steam is passed through a steam coil 43 to heat the glycol in vaporizer 28 to heat the ethane to a temperature of substantially 90° F. and at equilibrium pressure at this temperature which is 700 p.s.i.a. Both ethane liquid and ethane vapor are present in coil 30 and line 26 because of the equilibrium conditions maintained in the vaporizer. The ethane must not be heated to above its critical temperature of 90.32° F. at which the critical pressure is 709 p.s.i.a. because liquid ethane cannot be produced from ethane vapor at temperatures of 90.32° F. and above, no matter how high a pressure is exerted thereon.

Continued operation of pump 36 forces ethane fluid at 90° F. at about 700 p.s.i.a. through line 26 into manifold 20 and thence into the cylinders through individual fill lines 22 and 24. This causes a slight increase in pressure in the cylinders and the ethane forced therein which is not already in liquid form is liquefied so that the cylinders are ultimately charged to the preselected weight with ethane liquid. The scale 19 on which individual rack 16 rests is adjusted for the prescribed weight existing when the cylinder is loaded to the allowed maximum weight of liquid. When this weight is reached the valve in line 26 is closed and the cylinders are all loaded to the same level and therefore weight of liquid ethane. The valves in the necks of the cylinders are then closed and the loading lines are disconnected and the cylinders are removed for transportation to the consumer. The system is then ready for loading another series of cylinders.

If the ethane had been preheated so that it egressed from the vaporizer at only, e.g., 80° F. under equilibrium conditions, and the cylinders were filled to the same liquid level with the same weight of liquid ethane as in the foregoing example of commercial operation, the pressure of the system and in the cylinders would be about 650 p.s.i.a. This lower pressure within the filled cylinders would not be as effective in service with the ultimate user as is the higher load pressure of 700 p.s.i.a. However, it is feasible to utilize the system of the invention at lower pressures than just below the critical pressure and at equilibrium conditions.

The system disclosed herein is applicable to the loading of any liquefiable gas but has wide application to the loading of storage cylinders with light hydrocarbons such as acetylene, ethylene, ethane, propane, propylene, butane, butylenes, etc.

If desired, the loading sequence may be automatically controlled by using a motor valve in line 26 which is made responsive to the beam balance position on platform scale 19 thru electrical and/or pneumatic devices conventional in the control art. Thus, filling can be terminated automatically when the desired weight of loading is reached.

Certain modifications of the invention will become apparent to those skilled in the art and the illustrative details disclosed are not to be construed as imposing unnecessary limitations on the invention.

We claim:

1. A process for simultaneously loading a plurality of high pressure gas storage bottles of like shape, size, and construction with substantially equal weights of liquefied gas for transport of product which comprises the steps of:
   (1) maintaining a combined mass of said gas in liquid form at a temperature just below the critical temperature thereof;
   (2) positioning a plurality of said bottles in an inverted position at a fixed level, said cylinders having valved necks for admitting and dispensing fluid;
   (3) pumping liquid from the mass of step (1) simultaneously into each of the bottles of step (2) thru said necks while retaining all liquid entering said bottles;
   (4) weighing only one of said bottles during step (3); and
   (5) when a predetermined weight of said liquid is pumped into the weighed bottle of step (4), sealing each of said bottles by closing said valves.

2. A process for simultaneously loading a plurality of high pressure gas storage and transport cylinders of like shape, size, and construction with substantially equal weights of liquefied gas, each said cylinder having a valved filling and dispensing neck on its upper end when in upright position, which comprises the steps of:
   (1) pumping said gas in liquid form into a heat exchange zone and heating same therein to equilibrium temperature at a pressure near but below critical;
   (2) passing the resulting heated fluid simultaneously into a plurality of said cylinders in inverted position at the same neck level under substantially the pressure of step (1) thereby depositing said gas in liquid form in said cylinders;
   (3) supporting only one of said cylinders on a weighing device; and
   (4) cutting off flow of fluid to and sealing all of said cylinders when a predetermined weight representing a desired liquid level in said cylinders is reached, as indicated by said device, by closing the valves in said necks.

3. A process for simultaneously loading a plurality of high pressure gas storage cylinders of uniform shape, size, and construction with substantially equal weights of ethane and to a liquid level less than full, each said cylinder having a valved filling and dispensing neck on its upper end when in upright position which comprises the steps of:
   (1) pumping liquid ethane from a supply source to a vaporizer;
   (2) heating said ethane in said vaporizer to a temperature near but below the critical temperature while maintaining a equilibrium pressure therein at ambient temperature;
   (3) continuing said pumping and passing fluid under substantially the temperature and pressure conditions of step (2) into said cylinders from said vaporizer while said cylinders are supported in inverted position at the same neck level;
(4) supporting only one of said cylinders on a weighing device; and
(5) when a predetermined weight of ethane has been deposited in said one cylinder, cutting off the flow of ethane to and sealing all of said cylinders by closing the neck valves thereof so as to terminate loading at substantially the same level therein.

4. The process of claim 3 wherein the temperature and pressure in said vaporizer are maintained at 90° F. and 700 p.s.i.a. so as to fill said cylinders to said level at maximum permissible pressure.

5. Apparatus for loading with liquefied gas a plurality of uniform gas storage and transport cylinders having valved filling and dispensing necks on their upper ends when in upright position as the only fluid access thereto which comprises in combination:
(1) a rack for supporting a plurality of said storage cylinders in an inverted position including receivers for the necks of said cylinders at a uniform level;
(2) a separate single cylinder-holding rack having a receiver for the neck of a cylinder at the same level as in (1);
(3) weighing means supporting the single rack of (2) in weighing relation at said level;
(4) a manifold conduit extending along the rack of (1);
(5) an individual flexible loading line for each cylinder rack space connected with the manifold conduit of (4);
(6) a fluid supply vessel having heating means therein;
(7) a conduit connecting the vessel of (6) with the the manifold conduit of (4); and
(8) pumping means for forcing fluid from the vessel of (6) thru the conduits of (7) and (4) and the loading lines of (5).

References Cited by the Examiner

UNITED STATES PATENTS

| | | | |
|---|---|---|---|
| 2,075,408 | 3/1937 | Sholes | 62—49 |
| 2,088,060 | 7/1937 | Hiller et al. | 62—49 X |
| 2,384,677 | 9/1945 | Hill | 62—49 X |
| 2,545,118 | 3/1951 | St. Clair | 62—49 |
| 2,552,783 | 5/1951 | Harser | 62—49 X |
| 2,777,296 | 1/1957 | Schilling | 62—49 X |

ROBERT A. O'LEARY, *Primary Examiner.*

LLOYD L. KING, *Examiner.*